United States Patent [19]

Laux

[11] Patent Number: 5,318,477
[45] Date of Patent: Jun. 7, 1994

[54] MOTOR-TO-SPOOL COUPLING FOR ROTARY-TO-ROTARY DIRECT DRIVE VALVE

[75] Inventor: Kenneth Laux, Newhall, Calif.
[73] Assignee: HR Textron Inc., Valencia, Calif.
[21] Appl. No.: 980,011
[22] Filed: Nov. 23, 1992
[51] Int. Cl.$^5$ ............................................. F16D 7/04
[52] U.S. Cl. ............................................. 464/37; 464/100
[58] Field of Search ............... 464/30, 37, 51, 100, 464/77, 182; 403/383, 359

[56] References Cited

U.S. PATENT DOCUMENTS

| | | |
|---|---|---|
| 4,546,338 | 10/1985 | Idogaki et al. . |
| 4,641,812 | 2/1987 | Vanderlaan et al. . |
| 4,742,322 | 5/1988 | Johnson et al. . |
| 4,786,536 | 11/1988 | Kaempen ............................ 464/100 |
| 4,789,132 | 12/1988 | Fujita et al. . |
| 4,878,880 | 11/1989 | Williams ............................ 464/37 |
| 5,006,007 | 4/1991 | Fischer et al. ..................... 403/359 |

FOREIGN PATENT DOCUMENTS

| | | | |
|---|---|---|---|
| 373461 | 10/1969 | U.S.S.R. ............................ 403/359 |
| 1237808 | 4/1986 | U.S.S.R. ............................ 464/30 |

*Primary Examiner*—Daniel P. Stodola
*Assistant Examiner*—Eileen A. Dunn
*Attorney, Agent, or Firm*—Robbins, Berliner & Carson

[57] ABSTRACT

A coupling between a direct drive valve and a rotary valve for providing a rotary-to-rotary coupling therebetween. A shaft carried by the rotor of the motor defines a re-entrant bore having a plurality of flat surfaces. A rod having a plurality of flat faces on the exterior surface thereof and which is connected to the rotary valve is received in mating engagement with the bore. The shaft is slotted to provide a plurality of flexible fingers for receiving the rod.

4 Claims, 1 Drawing Sheet

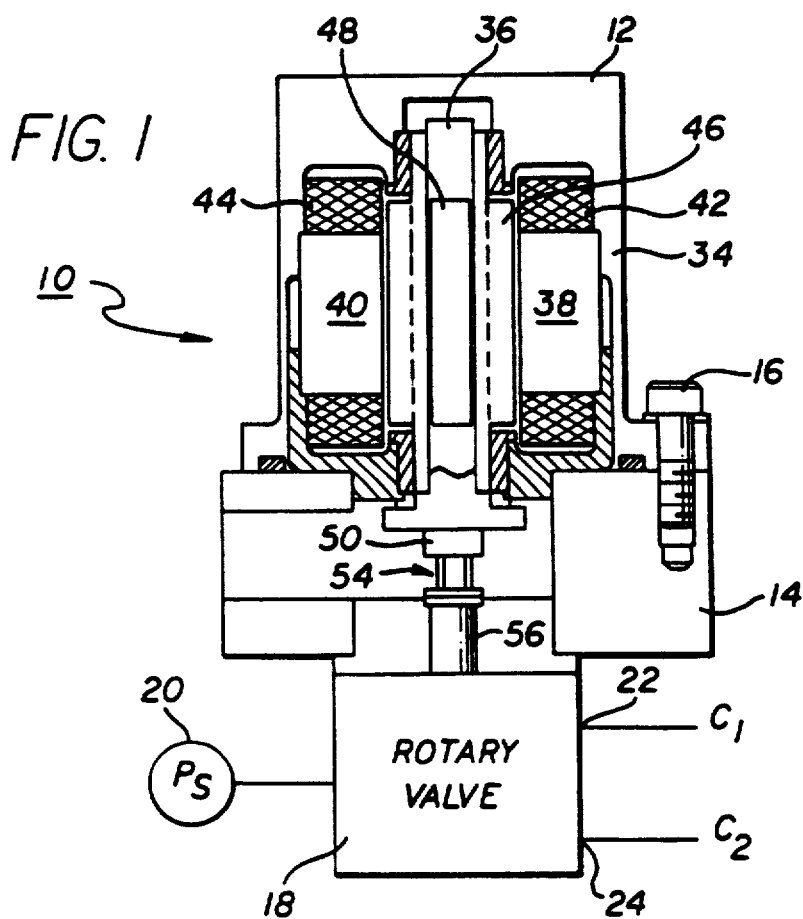

MOTOR-TO-SPOOL COUPLING FOR ROTARY-TO-ROTARY DIRECT DRIVE VALVE

FIELD OF THE INVENTION

This invention relates to direct drive valves and more particularly to a direct drive valve in which rotational motion of a motor rotor is transmitted to a rotary valve and more specifically to the coupling between the rotor and the valve.

BACKGROUND OF THE INVENTION

Torque motor driven valves are well known in the art including such valves which operate through the utilization of a rotary torque motor having a drive member extending from the rotor thereof into contact with the spool valve to directly drive the valve within a bore provided in the valve housing. When the valve rotates it controls the flow of fluid from a source thereof to a load in response to the electrical signals applied to the drive motor.

In all such direct drive valves known to Applicant, the connection of the motor drive shaft to the valve requires precision machining to maintain alignment. Also in many instances, backlash occurs because of the over travel of the connection.

SUMMARY OF THE INVENTION

In accordance with the present invention there is provided a direct drive valve which includes a valve driven by a motor having a stator and rotor. A shaft is carried by the rotor and has a distal end which defines a re-entrant bore therein having a plurality of flat surfaces. A rod having a plurality of flat faces on the exterior surface thereof is received in mating engagement within the bore. The shaft is slotted to provide a plurality of flexible fingers for receiving the rod.

BRIEF DESCRIPTION OF THE DRAWINGS

FIG. 1 is a partial cross-sectional schematic view of a direct drive valve constructed in accordance with the principles of the present invention;

FIG. 2 is a partial cross-sectional view of the coupling between the rotor shaft and the valve; and FIG. 3 is a cross-sectional view taken about the lines 3—3 of FIG. 2.

DETAILED DESCRIPTION

Referring now more specifically to FIG. 1, there is shown a direct drive valve 10 constructed in accordance with the principles of the present invention. As is therein shown, the valve 10 includes a motor 12 which is attached to a housing 14 by fasteners such as bolts 16 as is well known to those skilled in the art. Attached to the housing 14 is a valve means shown generally at 18. The valve means 18 is a rotary valve and controls the flow of fluid under pressure from a source 20 thereof to ports 22 and 24 for the control of a load apparatus (not shown). Rotation of the rotary valve 18 is accomplished through coupling to the motor 12. The motor 12 includes a stator 34 and a rotor 36. The stator 34 includes magnetic pole pieces 38 and 40 and drive windings 42 and 44. These drive windings are connected to receive an electrical drive signal from an external source (not shown). This electrical drive signal controls the positioning of the rotary valve 18 in a matter to be described below.

The drive motor 12 rotor includes permanent magnets 46 carried on a shaft 48 which is supported by appropriate bearings as is well known to those skilled in the art. The shaft 48 includes an end 50 extending therefrom. The end 50 is attached by a coupling 54 to a rod 56 which in turn is rigidly attached at its opposite end to the valve 18.

By reference now more specifically to FIGS. 2 and 3, the coupling 54 is illustrated more in detail. As is therein shown, the distal end 58 of the shaft end 50 defines a re-entrant bore 60 therein. The wall of the shaft end 50 has a reduced diameter as shown at 62. Also provided in the wall of the shaft end 50 is a plurality of slots 64–74. These slots provide a plurality of fingers 76–86 at the distal end 58 of the shaft 50. The reduced diameter wall portion 62 causes the fingers 76–86 to be somewhat flexible. As is shown particularly in FIG. 3, the interior surface of the re-entrant bore 60 defines a plurality of segmented flat surfaces 88–98.

The rod 56 has formed adjacent the end 100 thereof a plurality of flat surfaces 102–112. The flat surfaces on the rod 56 mate with flat surfaces on the interior of the re-entrant bore 60 thereby providing a zero backlash engagement between the motor rotor and the valve rod. As a result of the flexibility provided by the reduced diameter section 62 in the wall defining the re-entrant bore, the alignment of the shaft 50 and the rod 56 do not have to be exactly precise. Thus, some eccentricity between the two may be accommodated.

To retain a firm coupling, a spring 114 is seated within a groove 116 provided about the exterior of the distal end 58 of the shaft end 50. As noted particularly in FIG. 3, the spring 114 is a split spring which can be easily inserted in place or removed as the case may be. As a result, the coupling between the motor and the valve constructed in accordance with the principles of the present invention is very simple in construction, is non-critical in alignment and can be assembled in a blind fashion.

I claim:

1. A coupling for a rotary-to-rotary direct drive servovalve having a motor including a stator and a rotor and a valve driven by said motor comprising:
   (A) a shaft carried by said rotor and having a distal end;
   (B) said shaft distal end having a plurality of elongated substantially flat surfaces extending from said shaft and defining a re-entrant bore;
   (C) a plurality of slots formed in said shaft extending from said distal end to divide said flat surfaces into segments;
   (D) a rod carried by said valve and having an exterior surface;
   (E) a plurality of flat surfaces on said exterior surface; and
   (F) said re-entrant bore receiving said rod with flat surfaces within said bore mating with flat surfaces on said rod.

2. A coupling as defined in claim 1 which further includes spring means surrounding said shaft adjacent said distal end to urge said segments toward each other.

3. A coupling as defined in claim 2 wherein said flat surface on said re-entrant bore and on said rod exterior surface are equal in number.

4. A coupling as defined in claim 3 wherein said shaft defines a groove adjacent said distal end and said spring means is received within said groove.

* * * * *